United States Patent [19]
Borlinghaus et al.

[11] Patent Number: 5,878,859
[45] Date of Patent: *Mar. 9, 1999

[54] MANUAL VEHICLE SEAT ADJUSTER WITH QUICK RELEASE CLUTCH

[75] Inventors: Hans Juergen Borlinghaus, Clinton Township, Macomb County; Edgar Harry Schlaps, Washington; James Peter Nini, Clinton Township, Macomb County, all of Mich.

[73] Assignee: Lear Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 854,265

[22] Filed: May 9, 1997

[51] Int. Cl.$^6$ ............................... B60N 2/08; F16D 13/44
[52] U.S. Cl. ......................... 192/90; 192/84.1; 248/429; 297/216.18; 297/344.1; 74/528; 74/545
[58] Field of Search ............................... 192/45, 90, 84.1, 192/84.9, 30 R; 384/905; 74/523, 528, 545; 297/216.18, 337, 341, 344.1; 248/424, 429; 296/68.1; 310/328

[56] References Cited

U.S. PATENT DOCUMENTS

| | | | |
|---|---|---|---|
| 4,636,679 | 1/1987 | Glett et al. | 310/192 |
| 4,664,442 | 5/1987 | Stolper et al. | 297/216.18 |
| 4,781,354 | 11/1988 | Nihei et al. | 248/429 |
| 4,930,608 | 6/1990 | Schenk et al. | 192/84.9 X |
| 5,377,802 | 1/1995 | Ide | 192/84.1 X |
| 5,641,145 | 6/1997 | Droulon et al. | 248/429 |
| 5,667,046 | 9/1997 | Stanton et al. | 192/45 |

*Primary Examiner*—Richard M. Lorence
*Attorney, Agent, or Firm*—Brooks & Kushman P.C.

[57] ABSTRACT

A quick release clutch interposed between the handle and rod of a manual seat adjuster uses a piezoelectric element to create a rapid disconnect on the selective application of an electrical signal. A resilient bearing on one side of a shoulder interface maintains frictional contact between two clutch members, while an expandable piezoelectric stack on the other side pushes the shoulders apart.

3 Claims, 3 Drawing Sheets

5,878,859

MANUAL VEHICLE SEAT ADJUSTER WITH QUICK RELEASE CLUTCH

TECHNICAL FIELD

This invention relates to manual vehicle seat adjusters in general, and specifically to an adjuster with a direct quick release clutch to disconnect the handle and rod of the adjuster.

BACKGROUND OF THE INVENTION

Manually operated vehicle seat adjusters typically have an elongated rod journaled to the upper channel of one of a pair of slidable seat tracks, which rod serves both as the central pivot axis for, and prime mover of, the various components of a seat latch. The rod is turned manually by a generally L shaped handle at the end, which is normally rotated down along with the rod and held down by the same return spring that biases the seat latch down into locked position. The rod and handle are typically one continuous piece, with no disconnect therebetween.

There is a potential need for a quick disconnect means for such a manual seat adjuster, one capable of a very rapid response, in the order of no more than 10 milliseconds. More typical actuators, such as electrical solenoids, cannot operate that quickly. So called piezoelectric materials, which expand very quickly, if very slightly, with the application of a voltage, are capable of such quick responses. However, current thinking is that the amount of linear displacement of which such materials are capable is insufficient to render them effective in direct clutch or release applications.

SUMMARY OF THE INVENTION

The invention provides a direct acting, quick release clutch for a manual seat adjuster that is incorporated between the handle and rod of the adjuster, which disconnects the handle from the rod in response to an electrical signal from a suitable source.

In the preferred embodiment disclosed, one clutch member attached to the rod is nested within another clutch member attached to the handle, and the two clutch members are normally biased together so that they and the handle and rod turn one to one, but can be forced apart to turn freely relative to one another. A smaller diameter cylindrical sleeve of the rod clutch member is journaled concentrically inside a larger diameter cylindrical sleeve of the handle clutch member. An external annular shoulder on the smaller sleeve abuts with a matching internal annular shoulder of the larger sleeve, and the two shoulders are forced alternately axially together or apart to make or break the clutch connection. The shoulders are normally forced together into frictional engagement by an axially resilient and compressed bearing assembly that pushes off of the handle clutch member and against one side of the external shoulder. An elongated piezoelectric stack is interposed between the other side of the external shoulder and the handle clutch member, with a ball bearing located between the end of the stack and the external shoulder surface.

In its relaxed or unexpanded state, the piezoelectric stack just touches the bearing, but does not push against it or the external shoulder, and so does not disrupt the shoulder engagement created by the compressed bearing assembly on the other side. When the stack is linearly expanded, the force of its expansion is sufficient to push the external shoulder away from the handle clutch member, against the force of the resilient bearing on the other side, creating a gap between them. The two clutch members, and the handle and rod, are then able to turn freely, as the internal sleeve twists within the external sleeve and the external shoulder rotates relative to the internal shoulder, supported by the bearings on either side.

BRIEF DESCRIPTION OF THE DRAWINGS

These and other features of the invention will appear from the following written description, and from the drawings, in which.

DESCRIPTION OF THE PREFERRED EMBODIMENT

Figure 1:
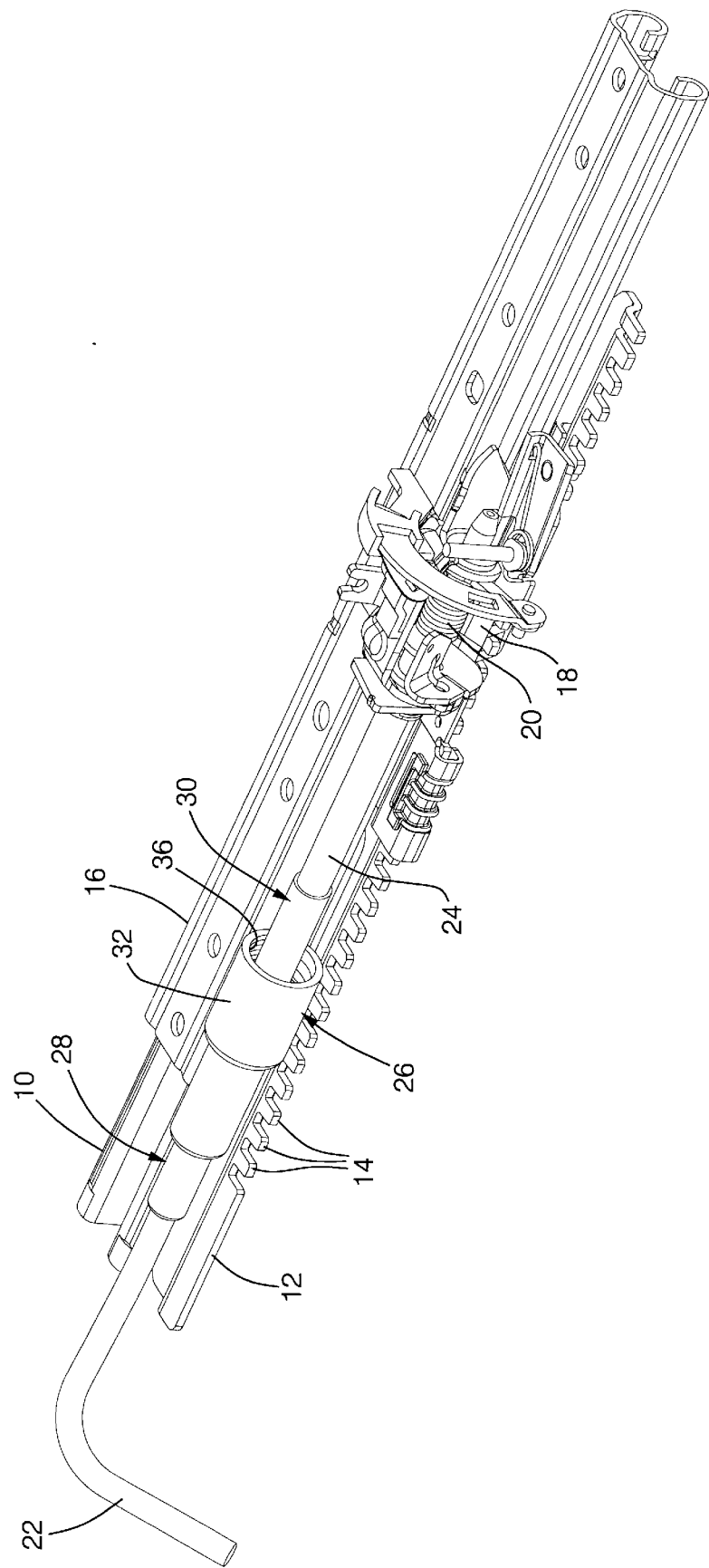
FIG. 1 perspective view of a vehicle seat track with a manual seat adjuster incorporating the quick release clutch of the invention.

Referring first to FIG. 1, a vehicle seat track has a stationary lower channel 10, which would be joined to the vehicle floor, and to which a lock plate 12 with a series of locking teeth 14 is fixed. A relatively slidable upper channel 16, which would be joined to a vehicle seat, is releasably locked to the lower channel 10 by lock bar mechanism, indicated generally at 18. The lock bar mechanism 18 is biased so as to continually rotate down under the force of a strong return spring 20. Lock bar mechanism 18 can be manually unlocked and rotated up against the force of spring 20 by a manual twist handle 22 that turns an elongated central rod 24. Rod 24 is journaled to upper channel 16 and provides the central axis about which various components of the lock bar mechanism 18 rotate. The same return spring 20 that rotates the lock bar mechanism 18 normally down and closed also biases the twist handle 22 down, when it isn't being manually pulled up. Typically, the handle 22 is simply integral to rod 24, with no disconnect mechanism therebetween. Here, a quick release clutch, indicated generally at 26, is provided to disconnect the two upon the selective application of a cylindrical signal.

Figure 2:
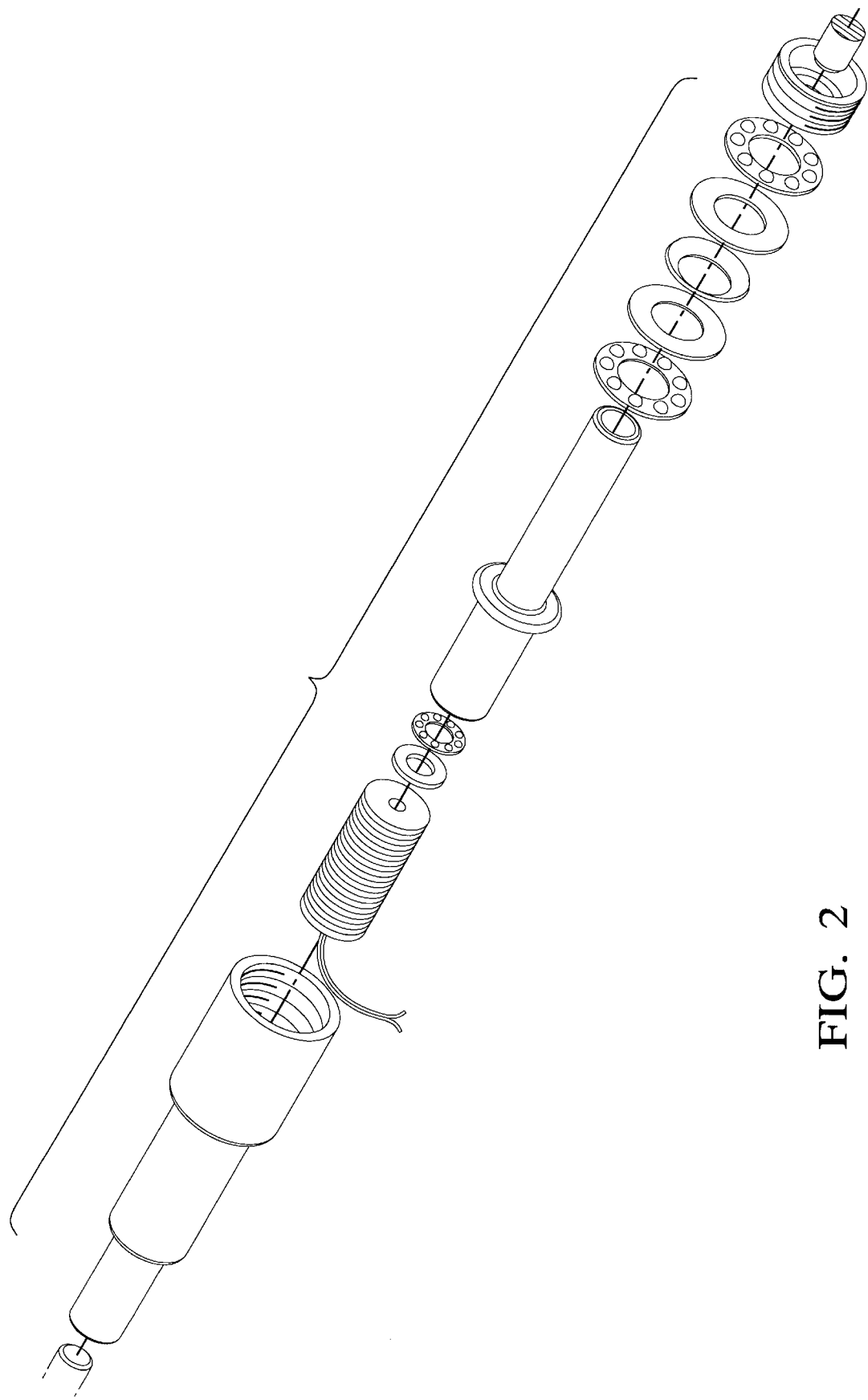
FIG. 2 is an exploded perspective view of a preferred embodiment the clutch.
Figure 3:
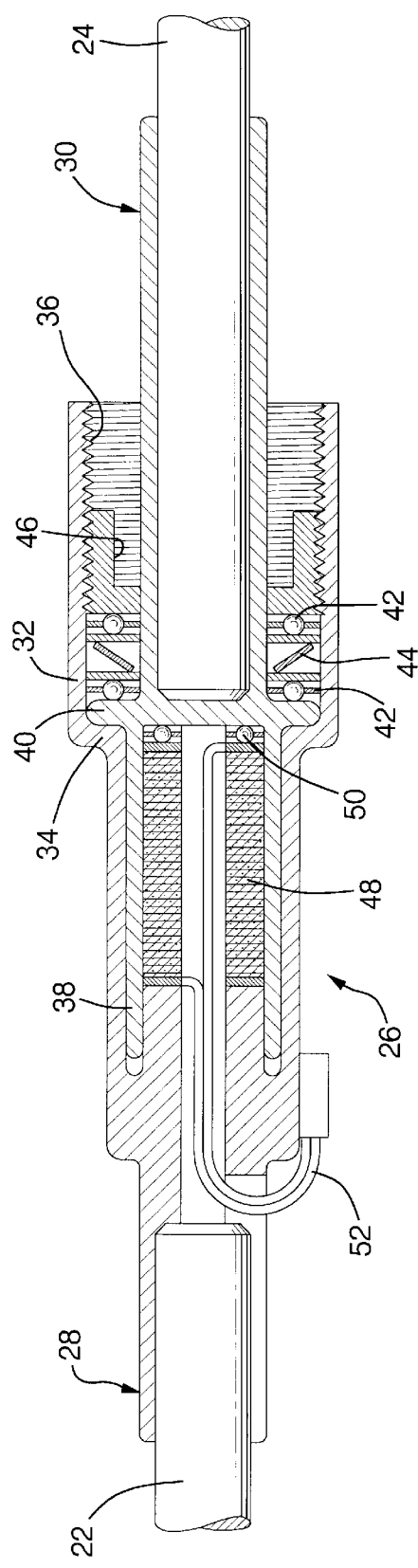
FIG. 3 is a cross sectional view of the clutch engaged.

Referring next to FIGS. 2 and 3, the various components of clutch 26 are shown both disassembled and exploded apart (FIG. 2) and assembled in a normal, engaged position (FIG. 3). A first clutch member, indicated generally at 28, is fixed to handle 22, and a second clutch member, indicated generally at 30, is fixed to rod 24. The two members 28 and 30 are normally biased together tightly enough to transmit sufficient torque from handle 22 to rod 24 to operate the lock bar mechanism 18, but can separate quickly upon application of an electrical voltage, as described further below. The handle clutch member 28 is larger in diameter, generally in the form of a hollow stepped diameter cylinder arrayed about the central axis of rod 24, shown by the dotted line in FIG. 2. Specifically, an external, stepped, external cylindrical sleeve 32 has an internal annular shoulder 34 and a threaded end 36. The rod clutch member 30 is smaller in diameter, with an internal cylindrical sleeve 38 that is journalled closely inside external sleeve 32 and an external annular shoulder 40 that is the proper size to abut with internal shoulder 34. The sleeves 32 and 38 are formed of a hard, durable and wear resistant material suitable for transferring torque between the abutted shoulders 34 and 40. To maintain the shoulders 34 and 40 normally in torque transmitting engagement, a resilient bearing assembly comprised of a pair of radial ball bearings 42 sandwich a resilient spring washer 44 between the outside of external shoulder 40 and a hollow set screw 46 that is threaded into external sleeve threaded end 36. The set screw 46 is tightened down sufficiently to in turn compress washer 44 sufficiently to press external shoulder 40 into internal shoulder 34 tightly enough to transmit the needed torque. Set screw 46 does not make rubbing contact with any part of the rod clutch member 30. On the other side of external shoulder 40, a piezoelectric stack 48 is closely axially contained between a radial ball bearing 50 and the bottom inner end of external sleeve 32, and fits closely, but without rubbing, inside of internal sleeve 38. Stack 48 is made up of a series of thin, flat disks of a suitable piezoelectric material, most likely a ceramic, and is generally cylindrical and arrayed about the same central axis of rod 24. The length of stack 48 would be on the order of an inch and a half long, in its normal, unexpanded state shown. Stack 48 would be closely and exactly fitted into the axial space available, as by choosing the thickness of some of the individual layers, or the thickness of the bearing 50, during assembly so as to just touch the back surface of external shoulder 40 without binding. A suitable circuit 52 brackets the two ends of stack 48, ready to selectively apply a voltage thereto and cause it to expand in length on the order of one per cent, yielding a length increase increment on the order of about 20 thousandths of an inch. The circuit 52, in turn, would be connected, for example, to an inertial sensor of the type used to trigger air bag inflation.

Figure 4:
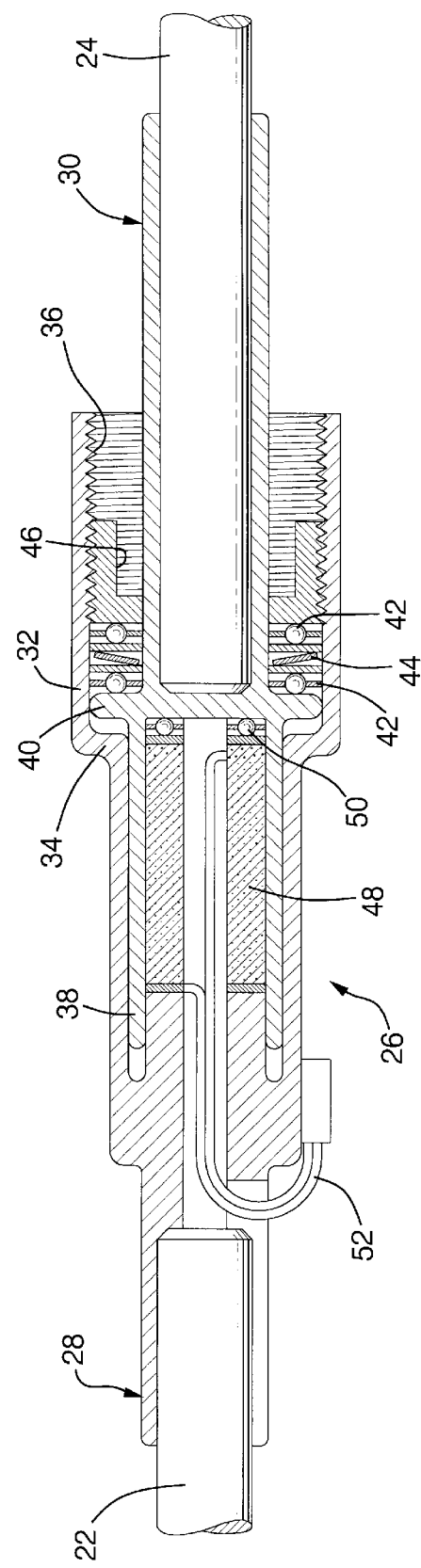
FIG. 4 is a cross sectional view of the clutch released.

Referring next to FIGS. 3 and 4, the basic operation of clutch 26 is illustrated. In the FIG. 3 normal, engaged position, the stack 48 applies no force to the back side of external shoulder 40, which remains tightly engaged with internal shoulder 34 under the force of the compressed resilient washer 44. If the handle 22 is twisted up it turns the two clutch members 28 and 30 together, through the tight interface of shoulders 34 and 40, ultimately turning the rod 24 to operate the lock bar mechanism 18. As seen in FIG. 4, in the event of a voltage applied across stack 48, it expands very quickly, in the range of 10 milliseconds, as well as far and forcefully enough to push external shoulder 40 away from internal shoulder 34. This compresses washer 44 slightly more, and opens up a gap sufficient to disconnect the two clutch members 28 and 30. Any force applied to handle 22 cannot then be transmitted to rod 24, and the return spring 20 will serve to keep the lock bar mechanism 18 locked to the teeth 14, while keeping the upper channel 16 locked to lower channel 10. Any torque applied to either the handle 22 or rod 24 will result only in free turning between the clutch members 28 and 30. It will be recalled that the set screw 46 does not rub on the handle clutch member 28, nor does the stack 48 rub inside the internal sleeve 38. The internal sleeve 38 turns freely within the external sleeve 32 and the external shoulder 40, while it is biased tightly between the compressed washer 44 on one side and the expanded stack 48 on the other, is supported for free turning by the ball bearings 42 and 50. Even a small gap of 20 thousandths of an inch would be sufficient to let the flat shoulders 34 and 40 turn freely past one another, and if the lock bar mechanism 18 were open when the clutch 26 released, it would quickly close under the force of its return spring 20.

Variations of the preferred embodiment could be made. The shoulders 34 and 40 could be part of clutch members that were more axially compact, without the elongated sleeves 38 and 32 journaled one within the other. However, the journaling of internal sleeve 38 deep within the external sleeve 38 provides more bearing support, and certainly more stability to the clutch 26, which is to say, more resistance against bending off of the central axis. The stack 48 and resilient washer 44 and bearings 42 could, theoretically, be switched, as far as the sides of shoulder 40 upon which they axially bear. However, the stack 48 fits easily within the internal sleeve 38, and need not be accessible once installed, which it is convenient to have the washer 44 accessible through the open threaded end 36 of external sleeve 32 for adjustment through the set screw 46. Therefore, it will be understood that it is not intended to limit the invention to just the embodiment disclosed.

We claim:

1. A direct, quick release clutch releasably connecting the handle and axial rod of a manual vehicle seat adjuster, comprising, a first clutch member fixed to one of said handle and rod, said first clutch member having a first annular shoulder arrayed about the axis of said rod, a second clutch member fixed to the other of said handle and rod, said second clutch member having a second annular shoulder arrayed about the axis of said rod in abutted relation with said first annular shoulder, an axially resilient bearing member interposed between said clutch members on one side of said shoulders to normally bias said shoulders tightly together and fix said clutch members in a one to one turning relation so that said handle may turn said rod one to one, and, an elongated piezoelectric stack expandable in length by the application of a voltage and interposed between said clutch members on the other side of said shoulders so as to be capable of pushing said shoulders apart to axially compress said resilient bearing member and thereby disconnect said shoulders to allow said clutch members to turn freely relative to one another on said bearing member.

2. A direct, quick release clutch releasably connecting the handle and axial rod of a manual vehicle seat adjuster, comprising, a first clutch member fixed to one of said handle and rod, said first clutch member having an external cylindrical sleeve and an internal annular shoulder arrayed about the axis of said rod, a second clutch member fixed to the other of said handle and rod, said second clutch member having an internal cylindrical sleeve and an external annular shoulder arrayed about the axis of said rod, said internal sleeve being journaled within said external sleeve with said shoulders in abutted relation, an axially resilient bearing member interposed between said clutch members on one side of said shoulders to normally bias said shoulders tightly together and fix said clutch members in a one to one turning relation so that said handle may turn said rod one to one, and, an elongated piezoelectric stack expandable in length by the application of a voltage and interposed between said clutch members on the other side of said shoulders so as to be capable of pushing said shoulders apart to axially compress said resilient bearing member and thereby disconnect said shoulders to allow said clutch members to turn freely relative to one another on said journaled sleeves and bearing member.

3. A direct, quick release clutch releasably connecting the handle and axial rod of a manual vehicle seat adjuster, comprising, a first clutch member fixed to one of said handle and rod, said first clutch member having an external cylindrical sleeve and an internal annular shoulder arrayed about the axis of said rod, a second clutch member fixed to the other of said handle and rod, said second clutch member having an internal cylindrical sleeve and an external annular shoulder arrayed about the axis of said rod, said internal sleeve being journaled within said external sleeve with said shoulders in abutted relation, an axially resilient bearing member interposed between said external sleeve and one side of said external shoulder to normally bias said shoulders tightly together and fix said clutch members in a one to one turning relation so that said handle may turn said rod one to one, and, an elongated piezoelectric stack expandable in length by the application of a voltage and located within said internal sleeve and interposed between said external sleeve and the other side of said external shoulder so as to be capable of pushing said shoulders apart to axially compress said resilient bearing member and thereby disconnect said shoulders to allow said clutch members to turn freely relative to one another on said journaled sleeves and bearing member.

* * * * *